Oct. 7, 1947.         A. R. PALMER              2,428,722
        CONVEYING OF DOUGH AND LIKE PLASTIC MATERIAL
             Filed Feb. 7, 1944       3 Sheets-Sheet 1

Inventor
A. R. Palmer

Inventor
A. R. Palmer

Oct. 7, 1947.   A. R. PALMER   2,428,722
CONVEYING OF DOUGH AND LIKE PLASTIC MATERIAL
Filed Feb. 7, 1944   3 Sheets-Sheet 3
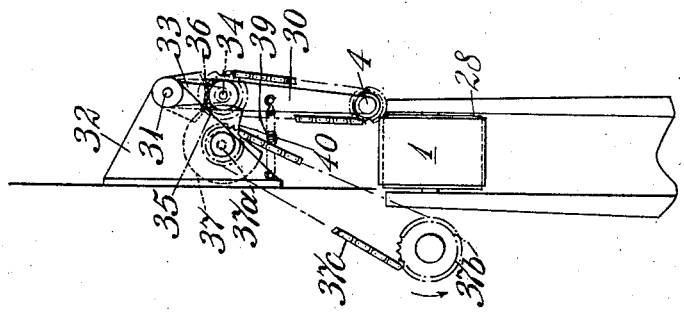
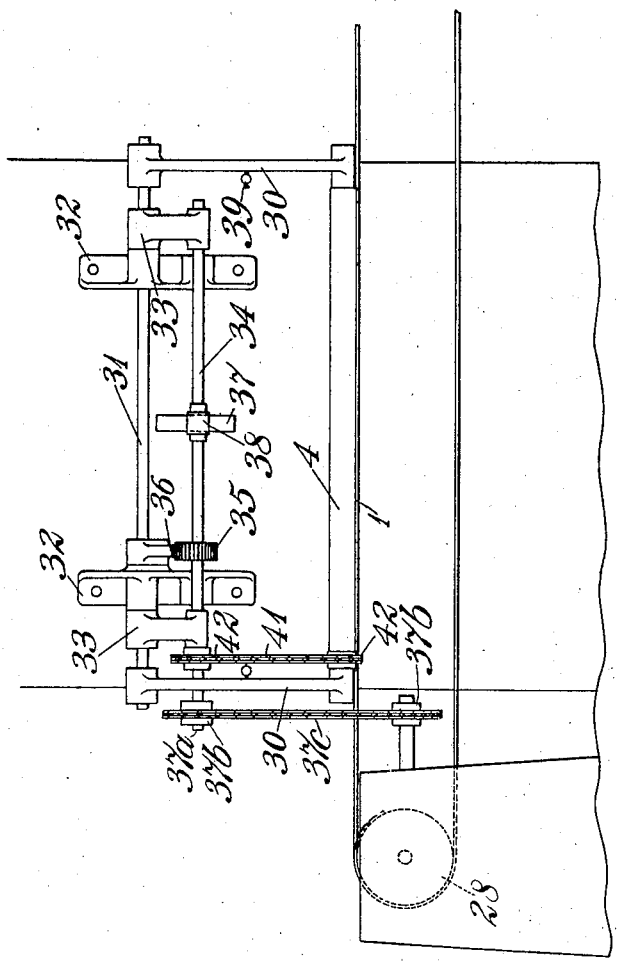
Inventor
A. R. Palmer Patented Oct. 7, 1947

2,428,722

UNITED STATES PATENT OFFICE 2,428,722

CONVEYING OF DOUGH AND LIKE PLASTIC MATERIAL

Austin Richard Palmer, Peterborough, England, assignor to Baker Perkins Inc., Saginaw, Mich.

Application February 7, 1944, Serial No. 521,406
In Great Britain March 25, 1943

7 Claims. (Cl. 198—24)

1

This invention relates to apparatus for conveying dough and like plastic material, referred to herein as dough, and has for its object to provide improved means for discharging a dough piece or a group of dough pieces transversely from a surface upon which they are being conveyed.

The invention is particularly suitable in connection with the automatic feeding of dough pieces to the pockets of a dough prover and the invention will be described in connection with such apparatus but is it to be understood that the invention may be utilised in connection with apparatus other than dough provers where it is necessary to discharge one or a group of dough pieces laterally from a conveying surface.

According to the invention a discharging element or bar is adapted to have a bodily sidewise reciprocating or to and fro movement imparted to it transversely of the dough conveying surface, and means are provided adapted to impart a rotary motion or a motion having an upward component to the element while it engages the dough piece (or pieces) in order to provide a lifting or rolling motion to the dough piece during the discharge stroke of the element.

The rotary motion of the bar may be positive or it may be applied by frictional engagement of the bar with a relatively stationary member during the reciprocating movement of the bar.

In the accompanying drawings—

Figures 5 and 6 are side view and end view of a modified machine.

Figure 1:
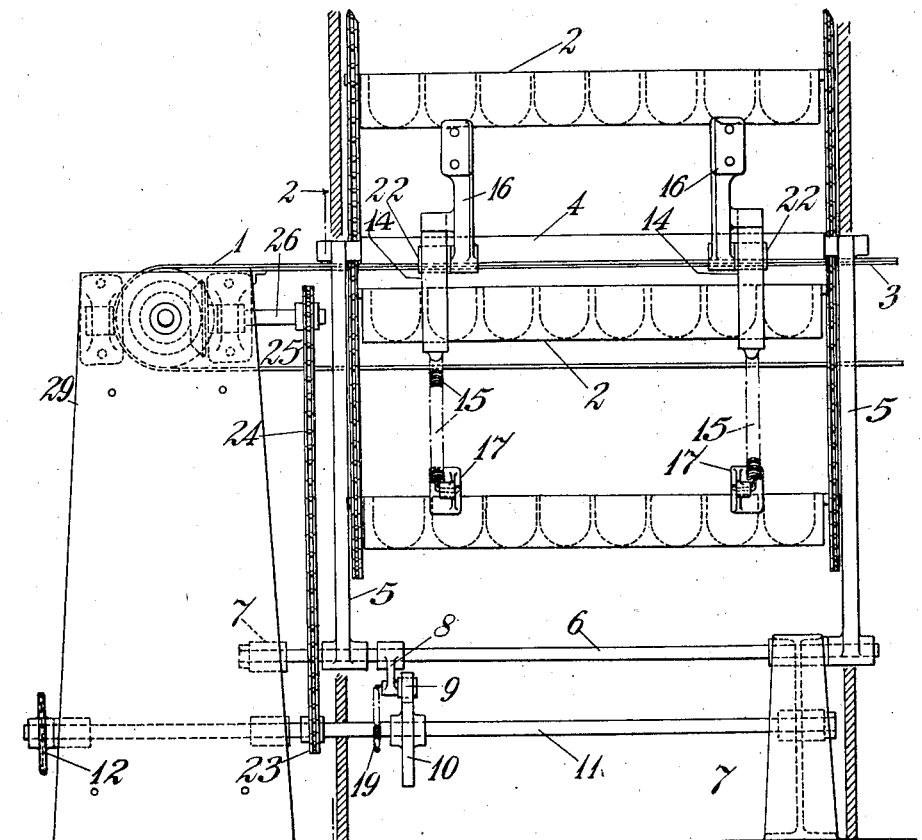
Figure 1 is a side view of a machine according to the invention.
Figure 4:
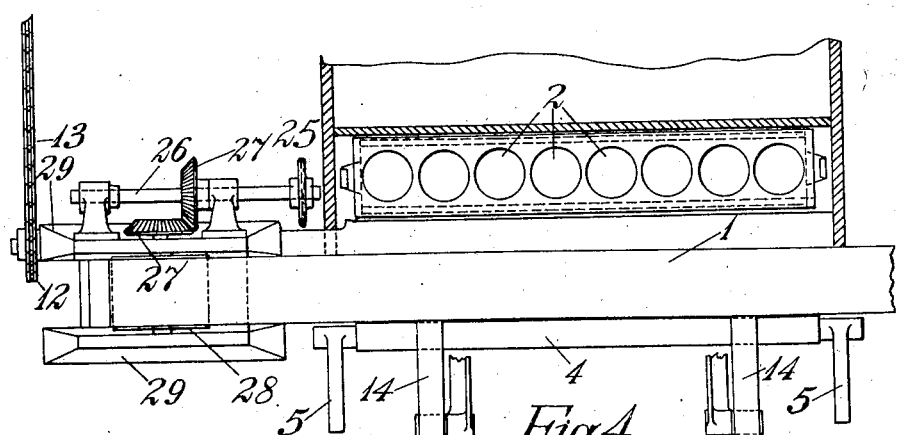
Figure 4 is a plan.
Figure 3:
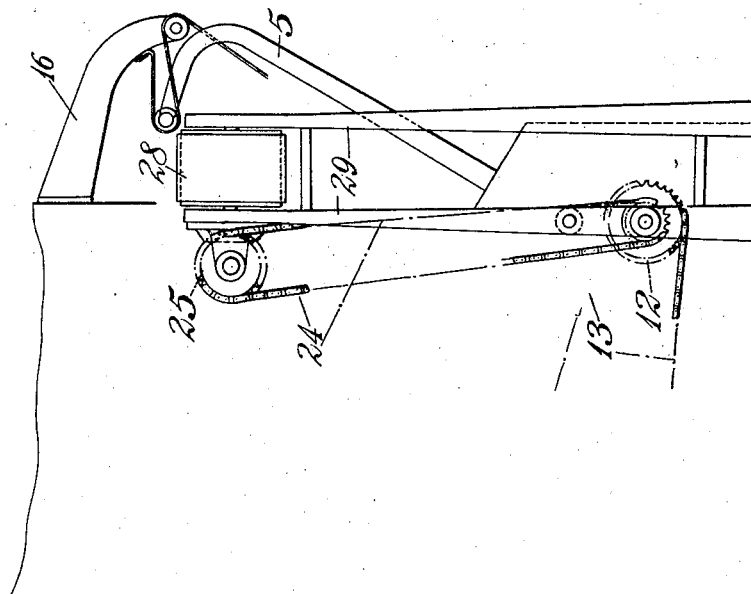
Figure 3 is an end view.

In carrying the invention into effect according to one convenient mode by way of example, as applied to a dough feed to a prover, a conveyor band 1 is provided extending across the face of a dough prover having pockets 2 at a position to feed dough pieces thereto. The conveyor 1 may be of canvas and is driven intermittently or continuously and passes over a table or support 3. Arranged parallel to the conveyor and adapted to reciprocate transversely across the upper conveying run thereof is transfer or feeding element such as bar or roll 4. The bar is carried by cranked or bent arms 5 which extend downwardly to a pivotal axis or shaft 6 below the conveyor and supported in bearings 7. One of the arms 5 or a separate arm 8 secured to the shaft 6 extends beyond the pivotal axis 6 and carries a roll 9 in

2 engagement with a rotary cam 10 adapted to cause an oscillating movement of the arms 5 and consequent reciprocation of the bar 4 across the conveyor 1. Preferably, the position of the pivotal axis or shaft 6 and the length of the arms 5 is such that the bar 4 moves across the conveyor on a rising path. The transfer bar 4 may be conveniently formed of tubular sections and is mounted upon the arms 5 by means of ball or roller bearings so that it may be rotated easily.

The diameter and the rotary movement of the bar or roll 4 on its operative or discharging stroke are such that the surface of the bar when engaging the dough pieces has an upward movement whereby a lifting and rolling movement is imparted to the dough pieces thereby overcoming the sticking of the dough pieces to the conveyor 1. The rotary movement of the bar may be produced in any convenient way, thus a track member such as a web (or webs) 14 of canvas or other suitable material may be wrapped around the bar 4, as on a drive wheel or pulley and may be held in contact therewith by a spring 15 or weight attached to a free end of the web, the other end of which is anchored to a bracket 16. The bracket also supports a freely running guide pulley 22 over which the web 14 runs. As the bar 4 moves to discharge or transfer the dough pieces the friction between the web (or webs) 14 and the bar causes the latter to rotate clockwise, Fig. 6, the spring 15 or weight allowing the relative travel between the web and bar. The free end of the spring is secured to a bracket 17.

The cam is provided with an abrupt drop 18 so that a quick feed 10 and return movement is imparted to the bar 4. In such case spring means 19 are necessary to overcome the action of the web spring 15 or weight. Alternatively the cam 10 may be provided with a rising path when the second spring 19 may be dispensed with.

A sloping guide board 20 may be provided to bridge the space between the conveyor and the pockets 2 of the dough prover.

When relatively small dough pieces are being delivered to the prover the action of the bar 4 may be such that the pieces will be projected across the waiting pocket and to ensure that they will be delivered into the pocket a baffle board 21 is provided against which the dough pieces will strike and then fall into the pocket.

The rotary cam 10 is mounted upon and driven by the shaft 11 which is driven by chain and sprocket 12, 13. From the shaft 11 a drive is taken by chain and sprockets 23, 24, 25 to a shaft 26. From the shaft 26 by means of bevel gearing 27 a drive is imparted to the drum 28 of the conveyor 1 which drum is carried in bearings supported by the brackets 29.

Instead of pivoting the supporting bar arms 5 below the conveyor 1 the arms may depend from a pivotal axis above the conveyor. Further the bar 4 may be positively driven.

Thus referring to Figures 5 and 6, the bar 4 is mounted in arms or levers 30 secured to a rock shaft 31 which is pivoted in bracket bearings 32.

Depending from the shaft 31 is a pair of short arms 33 which carry a shaft 34 adapted to be oscillated. For this purpose the shaft 34 is provided with a gear wheel 35 meshing with a toothed sector 36, which acts as a track member relatively fixed in position as a rack and pinion device.

Figure 2:
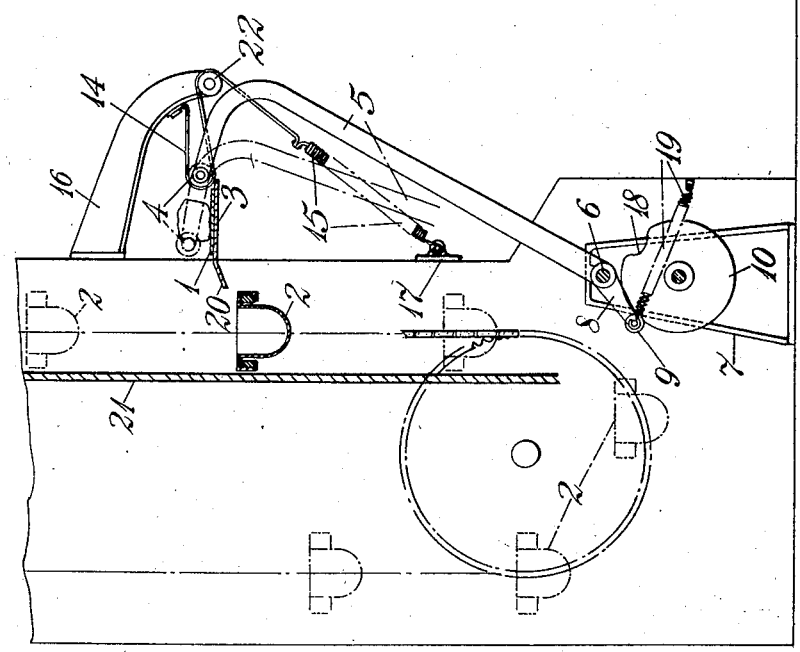
Figure 2 is a section taken at 2—2 of Figure 1.

The arms 33 are adapted to swing to and fro by a rotary cam 37 engaging a roll 38 on the shaft 34, such roll being held on to the cam by springs 39 acting on arms 30. The rotary cam 37 is secured to the shaft 37a which takes its drive from the conveyor band driving gear through sprockets 37b and chain 37c. As the cam 37 rotates the roll 38 moves into the depression 40 of the cam and the arms 30 and 33 and shaft 34 rock with the shaft 31, and by the engagement of the gear 35 with the fixed sector 36, the shaft 34 is revolved. This rotary movement of the shaft 34 is imparted to the roll 4 by the chain 41 and sprockets 42 and thus the bar 4 is given a partial rotation clockwise, Fig. 2, to lift the dough pieces. At the same time as the arms 30 are oscillated by the rock shaft 31, the bar preferably is given a rising movement relatively to the surface of the conveyor.

The drive of the cam is synchronised with the drive of the conveyor and prover so that the desired number of dough pieces are fed to each prover pocket.

I claim:

1. Means for discharging dough or like plastic pieces from a conveying surface comprising a rotatable element mounted for reciprocating movement bodily across the conveying surface, and means for bodily rotating said rotating element during the discharging stroke in a rising path relative to the conveying surface while the element engages the dough piece, to provide a lifting action and a rolling motion thereto.

2. Means for discharging dough or like plastic pieces from a conveying surface comprising a roll mounted for reciprocating movement bodily across the conveying surface in a rising path relative to the conveying surface; and means for imparting a rotary motion to the roll during its discharging stroke while it engages the dough piece to provide a lifting action and a rolling motion thereto.

3. Means for discharging dough pieces and the like from a surface upon which they are being conveyed, comprising a rotatable element mounted for bodily sidewise reciprocating movements crosswise of the conveyor surface; means operative during the discharge stroke for constraining said element to movement in a rising path relative to the surface of the conveyor; means adapted to rotate said element during its discharge stroke, the rotation being in such direction that upon engagement with the dough pieces the element tends to lift the pieces, and while so lifting and moving sidewise along the rising path, impels them to roll off the conveyor surface free from downward external pressure and from undesirable tendency to stick to the conveyor.

4. Means for discharging dough pieces and the like from a surface upon which they are being conveyed, comprising a rotatable element mounted for bodily sidewise reciprocating movements crosswise of the conveyor surface, means adapted to rotate said element during its discharge stroke, the diameter of the element and its direction of rotation being such that upon engagement with the dough pieces the element tends to lift the pieces, and while so lifting and moving sidewise impels them to roll off the conveyor surface free from downward external pressure and from undesirable tendency to stick to the conveyor.

5. Means for discharging dough pieces and the like from a surface upon which they are being conveyed, comprising a rotatable element mounted for bodily sidewise reciprocating movement crosswise of the conveyor surface; means adapted to rotate said element during its discharging stroke comprising a drive wheel on the rotatable element and a relatively fixed track member operatively connected with the wheel, the rotation of the element being in such direction that upon engagement with the dough pieces the element tends to lift the pieces and to roll them off the conveyor surface free from external downward pressure and from undesirable tendency to stick to the conveyor.

6. Means for discharging dough pieces and the like from a surface upon which they are being conveyed, comprising a rotatable roll element adapted for bodily sidewise reciprocating movement crosswise of the conveyor surface; mounting means for said roll comprising oscillatable arms pivoted on an axis below the conveyor and carrying said roll element, the position of the axis and the length of the arms being appropriate to constrain the roll throughout the discharging stroke to movement in a rising path relatively to the surface of the conveyor; means imparting reciprocating movement to said roll element; means adapted to rotate said roll element during its discharging stroke; such roll-rotating means comprising a web wrapped around a portion of the roll and yieldingly held at one end by spring means fastened to a fixed support, the other end of the web being anchored to another fixed support; the direction of rotation of the roll element being such that when engaging dough pieces it tends to lift them and while lifting impels them to roll off from the conveyor surface, freed from downward pressure and tendency to stick to the conveyor.

7. Means for discharging dough pieces and the like from a surface upon which they are being conveyed, comprising a rotatable roll element adapted for bodily sidewise reciprocating movement crosswise of the conveyor surface; mounting means for said roll comprising oscillatable arms pivoted on a rock-shaft above the conveyor, said arms having at their lower ends bearings for said roll element; the position of the rock-shaft and the length of the arms being appropriate to constrain the roll throughout its discharge stroke to movement in a rising path relatively to the surface of the conveyor; actuating means for said rock-shaft and the roll element, comprising short depending arms fixed to the rock-shaft and at their free ends carrying a revolvable shaft; means for rotating said roll element during its discharging stroke, comprising a gear wheel fixed to said revolvable shaft and meshing with a stationary toothed sector secured to a fixed support; and a power-driven cam-and-roll device adapted to oscillate the said revolvable shaft, the depending short arms, the rock-shaft, and the oscillatable roll-carrying arms; a drive operatively connecting the cam-oscillated shaft with the rotatable roll element; the direction of rotation of the roll element being such that when engaging dough pieces it tends to lift them and while lifting impels them to roll off from the conveyor surface, free from downward pressure and tendency to stick to the conveyor.

AUSTIN RICHARD PALMER.

REFERENCES CITED

The following references are of record in the file of this patent:

UNITED STATES PATENTS

| Number | Name | Date |
| --- | --- | --- |
| 915,542 | Biertuempfel | Mar. 16, 1909 |
| 1,580,670 | Nagy | Apr. 13, 1926 |
| 1,852,556 | Cramer | Apr. 5, 1932 |
| 1,890,740 | Marasso | Dec. 13, 1932 |
| 1,974,032 | Molins | Sept. 18, 1934 |
| 2,205,059 | Clark | June 18, 1940 |
| 2,224,735 | Leary | Dec. 10, 1940 |